Patented June 13, 1933

1,914,046

UNITED STATES PATENT OFFICE

MASAHARU SHIOZAWA AND SHIGERU SHIOZAWA, OF SHIBUYAMACHI TOYOTAMAGUN, JAPAN

PROCESS FOR MANUFACTURING MEDICINAL EXTRACT WINE

No Drawing.　　　　Application filed March 31, 1930. Serial No. 440,646.

The present invention relates to a process for manufacturing medicinal extract wine, which consists in that cut pieces of the medicinal materials of animal or vegetable origin, such as the viper or the ginseng, together with the starchy fermentative substances, as sake-lees produced in the usual manner by mixing koji, steamed rice or similar cereals and water, are subjected to alcoholic fermentation, thereby causing the yeast to decompose the organism of the raw materials, and alcohol, ester and carbon dioxide to extract, and dissolve into solution, the medicinal constitutents contained in the medicinal raw materials, and in that such inert gas as carbon dioxide or nitrogen is introduced under pressure into the fermented product in a container and kept sealed for the purpose of effecting rapid ripening or maturing due to the action of the inert gas, and after which the product is heated under stirring to set free the inert gas, and finally in that the whole is filtered, obtaining a clear solution, which if necessary be deodorized by suitable means for drinking purpose.

This invention has for its object to offer a reliable and effective method for obtaining medicinal extract wine, and also to easily obtain the noble and superior wine for medicinal purpose in a very short time.

The so-called "Serpent-Wine" has been known for a hundred years, and as serpent the viper has been chiefly used. In the process for making this serpent-wine, the viper is simply immersed in the ordinary wine, as brandy, and kept sealed for a very long time, from 5 to 50 years. It is probable that alcohol acts upon the organism of the viper, and dissolves its medicinal constituents into the wine, and that this wine thus may be effective for medicinal use. However, this process is defective in the fact that a long time is needed for extraction, and the extraction incomplete.

The process, which is known and in which the cut pieces of the viper or ginseng are heated with and in alcohol, similarly can not attain completely the object of extraction.

It is now found by the inventors that the medicinal constituents contained in the raw materials cannot be dissolved solely by the action of alcohol, but mainly by the action of yeast and ester and by the chemical action of fermentation.

This invention is based upon this discovery.

According to this invention, the viper, ginseng or other medicinal materials of vegetable or animal origin, used usually for medicinal purpose, are cut into pieces, and mixed with starchy fermentative substances, such as sake-lees, produced in the usual manner by mixing koji, steamed rice or similar cereals and water and subjected to alcoholic fermentation. The alcohol resulting from the fermentation serves not only for extraction, but also to act with the oil and other matters of the raw materials, to freshly produce various kinds of esters, which serve to extract such constituents as not extracted by alcohol. The ferment or yeast may serve to decompose the organism of the raw materials; and the carbon dioxide produced when fermenting penetrates the raw materials; and both the yeast and carbon dioxide helps the extraction.

After the fermentation, consequently the extraction has completed, the inert gas, such as carbon dioxide or nitrogen is introduced under pressure into the fermented product, and sealed in a container to effect ripening in a short time, owing to the action of the compressed inert gas. The pressure is then taken off, and the product is heated, under stirring, to liberate the gas and thereafter press-filtered, obtaining a clear solution of wine, the object of the invention.

One example of carrying out this invention is described in the following.

Fermentative materials are prepared from glutinous or non-glutinous rice in known way. In other words, sake-lees is prepared in ordinary way from ferment, steamed rice, malted-rice, and water. This sake-lees is mixed with 1-2 percent of cut pieces of the viper, or ginseng, and subjected to alcoholic fermentation, for 15 to 20 days, after which the fermentation comes to end. Then carbon dioxide gas is introduced under pressure into the fermented sake or wine in the container, and it is kept sealed for four to five hours, after which the whole content is heated, under stirring, by means of a steam jacket going into the container down to the bottom and again rising up to the surface and extending to discharge, to let the carbon dioxide gas escape, and then press-filtered, giving a clear solution of sake or wine, the object of the invention.

According to this invention, the complete extraction of the medicinal constituents of the raw material is not only easily realized by such simple means as mentioned, but also the constituents are dissolved into wine, which is produced with the extraction; and as the wine can be immediately ripened by the means that the wine is subjected under pressure to the action of the inert gas, the wine is directly made ready for drinking. The taste of the wine is also as sweet as the whisky preserved long. It is the matter of course that the wine is very useful for medicinal purposes, and that it may improve particularly the weak constitution of the body.

We claim:

1. The herein described process for making medicinal extract wine, consisting in fermenting a mixture of sake-lees with substantially 2 percent of pieces of viper, subjecting the same to alcoholic fermentation and ripening the same by introducing inert gas under pressure thereto and finally removing the compressed inert gas and filtering the product.

2. The herein described process for making medicinal extract wine, consisting in fermenting a mixture of sake-lees with substantially 2 percent of pieces of ginseng, subjecting the same to alcoholic fermentation and ripening the same by introducing inert gas under pressure thereto and finally removing the compressed inert gas and filtering the product.

3. Medicinal extract wine resulting from the fermentation of sake-lees together with substantially 2 percent of pieces of viper.

4. Medicinal extract wine resulting from the fermentation of sake-lees together with substantially 2 percent of pieces of ginseng.

In testimony whereof we hereunto affix our signatures.

MASAHARU SHIOZAWA.
SHIGERU SHIOZAWA.